United States Patent [19]
Milkovich et al.

[11] Patent Number: 5,290,504
[45] Date of Patent: Mar. 1, 1994

[54] CONTINUOUS AIR BEARING VAPOR STABILIZATION SYSTEM AND METHOD

[75] Inventors: Stephen A. Milkovich, Beacon; Robert W. Nufer, Hopewell Junction, both of N.Y.

[73] Assignee: International Business Machines Corporation, Armonk, N.Y.

[21] Appl. No.: 968,914

[22] Filed: Oct. 30, 1992

[51] Int. Cl.⁵ .................... C04B 33/30; B29B 17/00
[52] U.S. Cl. ................. 264/342 RE; 264/63; 264/343
[58] Field of Search .................. 264/63, 342 RE, 343

[56] References Cited

U.S. PATENT DOCUMENTS

| | | | |
|---|---|---|---|
| 3,395,943 | 8/1968 | Wilde et al. | 302/32 |
| 3,953,562 | 4/1976 | Hait et al. | 264/63 |
| 4,104,345 | 8/1978 | Anderson et al. | 264/43 |
| 4,690,591 | 9/1987 | Nagashima et al. | 406/88 |
| 4,808,365 | 2/1989 | Kellmer | 264/343 |

FOREIGN PATENT DOCUMENTS

| | | |
|---|---|---|
| 43457 | of 0000 | European Pat. Off. |
| 2192848 | of 0000 | United Kingdom |

OTHER PUBLICATIONS

R. W. Nufer, "High-Stability Green Sheet Binder" vol. 21, No. 11 Apr. 1979, pp. 4489-4490.

R. W. Nufer, "Ceramic Greensheet Technology for Glass-Ceramic/Copper Multilevel Substrates (ES9000 System)" 42nd Electronics Components and Technology Conference, May 18-22, 1992, pp. 673-677.

*Primary Examiner*—James Derrington
*Attorney, Agent, or Firm*—Graham S. Jones, II

[57] ABSTRACT

An in situ stabilizing tool provides a stress relieved, ceramic green sheet for green sheet screened stability. A green sheet stabilization system uses air bearings as a means of conveying a continuous ceramic green sheet web in a frictionless and stress free state. Solvent vapor stabilization of green sheets in a continuous mode adjusts solvent concentration in the air bearing using a solvent bubbler. Solvent vapor is generated from a group of solvents (e.g. hydrocarbons, water, etc.) that can be vaporized and used to solvent plasticize the ceramic green sheets to achieve stress relaxation. Take up loops and sensors adjust for longitudinal shrinkage during the green sheet relaxation process.

12 Claims, 5 Drawing Sheets

CONTINUOUS AIR BEARING VAPOR STABILIZATION SYSTEM AND METHOD

BACKGROUND OF THE INVENTION

1. Field of the Invention

This invention relates to the fabrication of multilayer ceramic (MLC) substrates adapted for mounting semiconductor devices, and wherein ceramic green sheets are punched with via holes and screened with metallurgical pastes for surface wiring and connections therethrough, in an environment wherein screened sheets are stacked and laminated forming a densely wired structure that is sintered to form the finished substrate. More particularly this invention relates to a system and a method for treating the ceramic green sheet to minimize the residual stresses that develop during sheet casting and drying.

2. Description of related art

High density packaging of semiconductor devices makes possible the mounting of over 100 chips on a single substrate as described in "Ceramic Green Sheet Technology for Glass/Ceramic Multilevel Substrate (ES 9000 System)" by R. W. Nufer, 42nd Electronics Components and Technology Conference, May 18–22, 1992. The Thermal Conduction Module (TCM) comprises 67 individual layers, each punched with over 78,000 via connections, and over 2 million internal wiring interconnections in the finished substrate. The fabrication of these high density requires a very stable green sheet as the basic building block for the MLC substrate in order to achieve precise alignment of all the millions of wiring interconnection.

Figure 1:
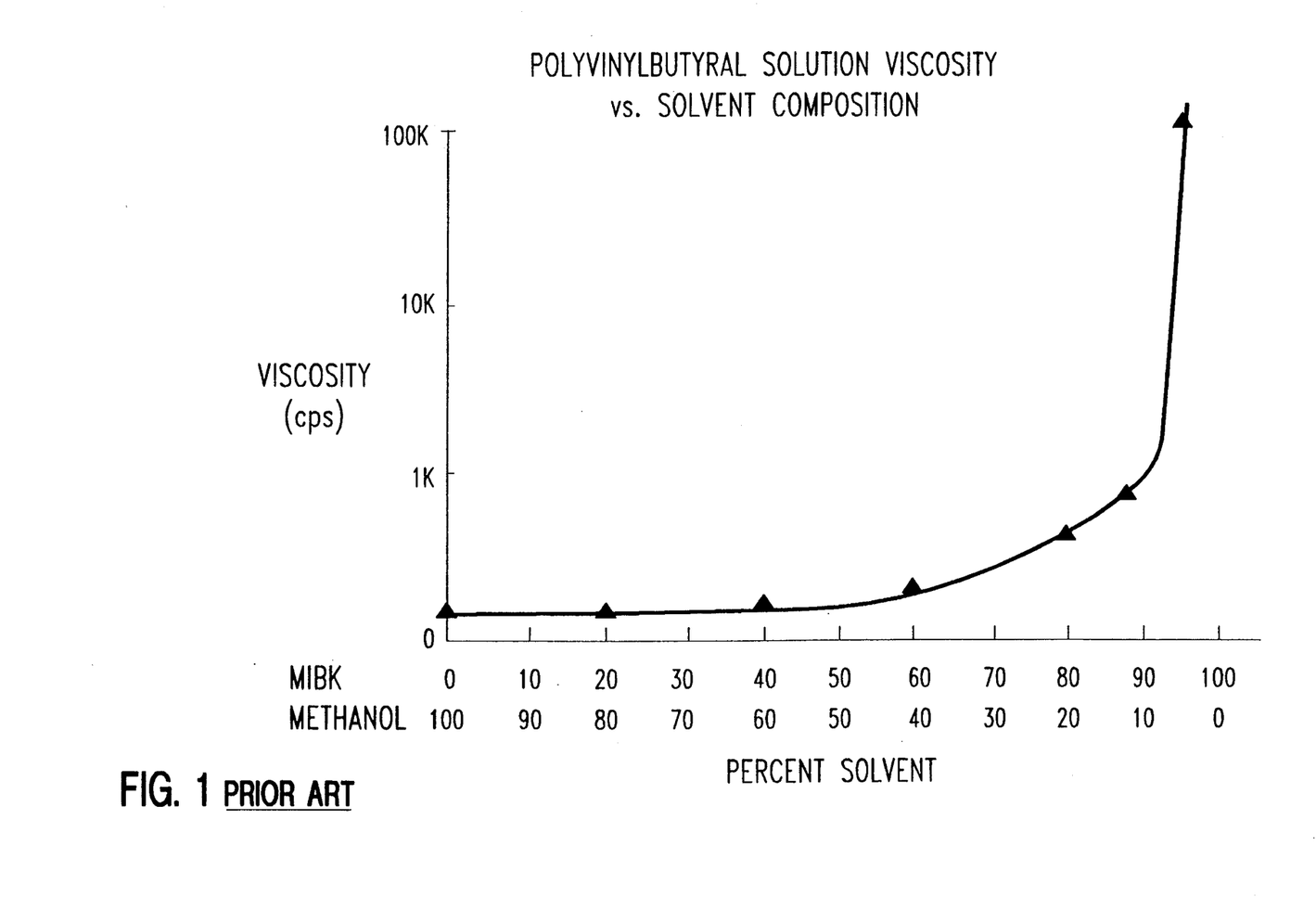
FIG. 1 shows a polyvinyl butyral (PBV) rheological curve based on changes in the solvent and the asolvent composition.

The green sheet for the TCM is cast from a slurry prepared from a thermoplastic binder and an organic solvent as described in U.S. Pat No. 4,104,345 to R. W. Nufer et al, to create a microporous green sheet that has sufficient porosity to compress during lamination and allow the metallurgical line to penetrate into the green sheet structure providing the sheet with greater than eight percent compressibility. A compressible green sheet, for suitable line enclosure, is achieved with a binary solvent system; methanol and Methylethyl Ketone (MIBK) which governs the slurry rheology during the final stages of sheet drying. After the slurry is cast onto a Polyethylene terephthlate carrier (PET), the methanol which is 3.2 times more volatile then the MIBK, causes a composition shift towards higher percentages of MIBK. This causes greater than 100X increase in viscosity as shown in FIG. 1. The polymer matrix sets in place while a substantial amount of solvent still remains, such that subsequent solvent volatilization causes minimal shrinkage while producing well controlled sheet porosity. Inherent in forming the sheet in this fashion are high residual stresses since the polymer molecular remains in an extended position and can not achieve its normal conformation. High internal stresses is undesirable since subsequent sheet processing where metallurgical pastes are screened onto the surfaces and into the via holes, plasticizes the green sheet, reducing the glass transition temperature(Tg) and permitting the movement and rearrangement of the previously "frozen" structure. This is unacceptable as higher density wiring requires tight dimensional tolerances, placing demands on green sheet stability.

In semiconductor packaging, some packages but primarily multilayer ceramic (MLC) structures are manufactured from ceramic green sheets. During a process of manufacturing of green sheets, the green ceramic material consisting of a sinterable type of ceramic and a labile binder system are solvated with an appropriate solvent to form a well dispersed slurry that is cast and dried, forming the ceramic green sheet. This green sheet serves as the basic building block for the MLC structure as described by A. J. Blodgett et al, IBM Research Development Journal No. 1, (Jan. 1982.). During the formation of the green sheet, a drying process occurs during which the volatile solvents evaporate transforming the slurry into a green sheet having significantly less volume. This drying process introduces drying stresses that remain until subsequent processing when metallurgical patterns and through via holes are screened with metallurgical paste that contains organic components that absorb into the ceramic green sheet. The paste solvents plasticize the green sheet reducing the glass transition temperature, thereby permitting the movement and rearrangement of the previously "frozen" molecular structure. This is unacceptable as higher density wiring requires tighter dimensional tolerance of the green sheet. Accordingly, the requirements of higher density wiring requires more stability of the dimensions of the green sheets.

In one process, ceramic green sheets produced for glass ceramic substrates have been formed using a continuous casting process where a slurry is cast with a doctor blade onto a polyethylene terephthalate (PET), known as (Mylar ® Registered TradeMark) carrier. Then the slurry is dried at an accelerated rate within the continuous caster. The drying of the slurry on the PET carrier causes the formation of drying stresses in the final sheet. These stresses have been minimized in some products by careful control of sheet drying in relation to the separation from the PET carrier. Stress relaxation has in this case been facilitated to some degree by stripping the green sheet from the carrier prior to the removal of all of the solvents. The green sheet is therefore in a partially plasticized state that allows for some stress relaxation. However, total relaxation and stress relief is impractical at this stage since the desirable level of plasticization would prevent separation from the PET carrier and cause physically induced stresses in the longitudinal direction.

Drying stresses are undesirable since they produce dimensional changes in the green sheets during metallurgical screening. The screening instabilities which can be in excess of several mils can be disastrous in maintaining the alignment of the millions of vias in a high density Thermal Conduction Module (TCM) substrate. The stresses in the green sheet cause this movement because the paste and solvent plasticize the green sheets, reducing the glass transition temperature of the green sheets and permitting a movement and rearrangement of the molecular structures of the material in the sheet. Therefore the elimination of these internal drying stresses is desirable, especially as electronic products become more complex with higher density wiring where dimensional tolerances place greater demands on sheet stability.

Stress can be eliminated in a green sheet by solvent stabilization as taught in commonly assigned U.S. Pat. No. 3,953,562 "Process for the Elimination of Dimensional Change in Ceramic Green Sheets" of G. F. Hait and R. W. Nufer et al solvent stabilization is used to eliminate the instability in screened green sheets by temporarily superplasticizing (plasticize and soften but not dissolve) a thermoplastic binder. During the vapor stabilization process the green sheet is exposed to a solvent that will diffuse instantaneously into the sheet. A higher vapor pressure solvent is desired. This superplasticizes the binder transforming the green sheet into a sheet having the appearance of a wet noodle. The superplasticization process reduces the glass transition temperature of the binder substantially below ambient temperatures and allows for immediate stress relaxation. Following relaxation the plasticizing solvent diffuses equally fast from the sheet returning its normal mechanical properties.

The relative evaporation rate of a solvent is a function of its ambient temperature which produces increased vapor pressure as temperature rises. The rate of evaporation and solvent vapor pressure at a temperature of 20° C. is given in Solvents Guide, C. Mardsden, Cleaver-Hume Press Ltd. The higher vapor pressure solvent such as methylene chloride (dichloro-methane, methylene dichloride) with a 349 mm Hg vapor pressure and relative evaporation rate of about 1600 as based on n-butyl acetate being equal to 100 is desirable because of its greater volatility. An example of other less volatile solvents are as follows:

| Solvent | Relative Evaporation Rate n-butyl acetate = 100 |
| --- | --- |
| xylene | 70 |
| methyl isobutyl ketone (MIBK) | 165 |
| ethanol | 230 |
| methyl ethyl ketone (MEK) | 572 |
| methanol | 610 |
| acetone | 1160 |

"High-Stability Green Sheet Binder", R. W. Nufer, IBM Technical Disclosure Bulletin, Vol. 21, No. 11 pp. 4489-4490 (Apr. 1979) states, "A polymeric formulation that utilizes polyvinyl butyral resin and a plasticizer, dipropylene glycol dibenzoate, provides the ceramic green sheet with a greatly improved stability, especially after the green sheets have been vapor stabilized with methylene chloride, as shown by the results in the figure.

The general green sheet formulation is as follows:

| | Amounts |
| --- | --- |
| Alumina | 92% |
| Polyvinyl butyral resin | 6.4% |
| Dipropylene glycol dibenzoate plasticizer | 1.6% |

The system has improved tensile strength, bond strength and the distinct advantage of having increased compressibility when drying is accelerated on the continuous caster."

U.K. Patent Application GB 2192848 "Conveying Heating Apparatus and Method" of Drew describes an extrudate convoyed and heat-treated on a cushion of heated gas. The method provides heating to a temperature sufficient to set or otherwise dry and extrudate. The temperature mentioned is above 100° C. and preferably above 200° C. The cushion of hot air is created by a number of spaced nozzles angled in the direction of travel. Other stations may be added to treat the extrudate before it is removed from the chamber.

U.S. Pat. No. 4,690,591 of Nagashima et al for "Method and Apparatus for Transporting an Article in Vacuum" describes "apparatus for automatically transporting an article, such as a wafer for producing a semiconductor device, in a vacuum chamber for vacuum treatment of the article." Gas is ejected from inclined nozzles. The system is used to perform operations such as ion etching, using argon gas for dry etching. In the case of CVD treatment, then hydrogen gas or silane gas is substituted for argon gas. In the case of plasma etching, $CF_4$ is used (transported by argon gas.)

European EP—43457-A: 82.01.13, EP—43457-B: 86.04.23, DE3174452-G: 86.05.28; PR—80.07.03 8OUS-165579 of J. K. Hassan and J. A. Paivanas, commonly assigned, for an air bearing transport system for semiconductor wafers—uses longitudinally spaced holes to achieve effective coupling of axial-radial and coanda flow characteristics. The transporter incorporates at least two pairs of rows of air supply holes as required in the transporting track. The holes in each pair of rows are spaced longitudinally along the track, preferably with a spacing distance which is constant for pairs of holes in the same row at from 12.7 to 22.9 mm. The holes in each row on each side of the track centerline are spaced longitudinally from the holes in each adjacent row by a spacing distance, ranging from one to three quarters of the spacing distance and preferably are equal to half the spacing distance.

The air supplied to support a wafer is fed to the holes by way of air manifolds disposed longitudinally of the track. A long thin passage connects each hole to a respective manifold. The passages are angularly inclined both towards the track centerline and in the direction of transport of the wafer along the track, achieving both propulsion and motional stability of the wafer. The inclination of these passages towards the track centerline is greater the farther the distance of the row of passages from the centerline of the track.

SUMMARY OF THE INVENTION

An object of this invention is to provide an in situ stabilizing tool that will provide a stress relieved, ceramic green sheet that will guarantee ultimate green sheet screened stability.

Another object of this invention is a green sheet stablilization system using air bearings as a means of conveying a continuous web in a frictionless and stress free state.

A further object of this invention is solvent vapor stabilization of green sheets in a continuous mode whereby solvent concentration in the air bearing is adjusted using a solvent bubbler.

Still another object of this invention is generation of solvent vapor from a group of solvents (e.g. hydrocarbons, water, etc.) that can be vaporized and used to solvent plasticize the ceramic green sheets to achieve stress relaxation.

An additional object of this invention is provision of take up loops and sensors to adjust for longitudinal shrinkage during the green sheet relaxation process and maintain uniform spooling of the green sheet.

In accordance with this invention, a new process for stabilizing a cast, substantially completely dried ceramic green sheet tape comprises remaining casting solvent and a particulate ceramic and a thermoplastic polymeric binder. The process comprises passing the green sheet tape through an air bearing stabilization system provided with dual sided air bearings which float the green sheet tape upon a cushion of air whose solvent vapor is maintained by passing air for the air bearing through a bubbler.

Further in accordance with this invention angular air bearing jets are used to convey the green sheet during the process of relaxation.

In still another aspect of the invention, the process controls temperature of the air bearing to a temperature above the glass transition temperature of the ceramic green sheet or plasticized green sheet.

The angle of air bearing is adjusted so that the weight of the ceramic green sheet moves the green sheet tape forward by gravitational force.

The slope of the air bearing table is adjusted to provide a precise tension force on the green sheet tape, as a function of the green density of the green sheet and as a function of the configurational weight of the portion of the tape to provide loop control.

The tension force is controlled below the yield point of the solvent plasticized sheet, thus not imparting any longitudinal forces that would remain as inherent stresses in the dried sheet.

In accordance with this invention a supportive drying apparatus is provided that will convey the green sheet unstressed as it is stripped from the carrier while it is still in a highly plasticized state, preventing mechanically introduced stress.

In accordance with another aspect of this invention means is provided for adjusting the slope of the apparatus to permit gravitational directional feed of the ceramic tape on the air bearing surface. The forward force is controlled by the slope of the apparatus in conjunction with the weight of the sheet along the length of the apparatus and as a function of the weight of the tape in the exit loop.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Some salient features of the present invention are outlined at the outset below.

An air bearing stabilization system provides dual sided air bearings which float a green sheet upon a cushion of air whose solvent vapor is maintained by passing air through a bubbler.

Solvent concentration control

The temperature of the bubbler is adjusted to control vapor pressure as high as saturated air which in turn can be diluted by mixing air with the saturated air. Flow controls and proportional mixing valves can control the rate of mixing of solvent saturated gas with pure dry gas to provide the desired atmosphere about a green sheet being treated by the system as described in detail below.

Drying air bearings

Following the relaxation of the stress drying air bearings follow in line along the process.

Angular air bearing jets are used to convey the green sheet during the process of relaxation.

Figures 2A, 2B:
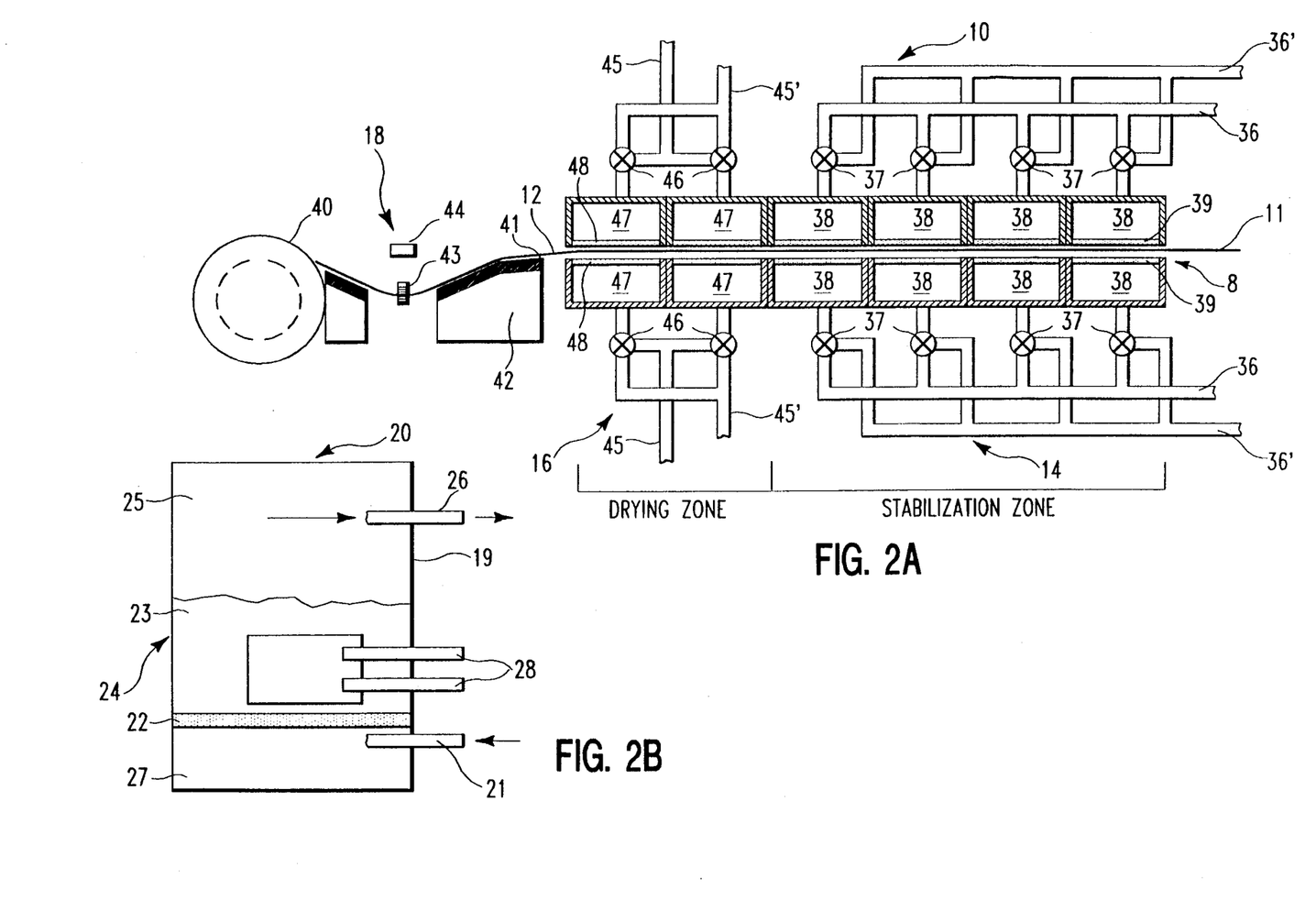
FIG. 2A shows an in situ air bearing stabilization system 10 that is placed in line with a continuous caster to receive a continuous green sheet, whose spooling rate of wind up spool is controlled with a loop sensor.
FIG. 2B shows a solvent vapor bubbler in accordance with this invention.
Figure 3:
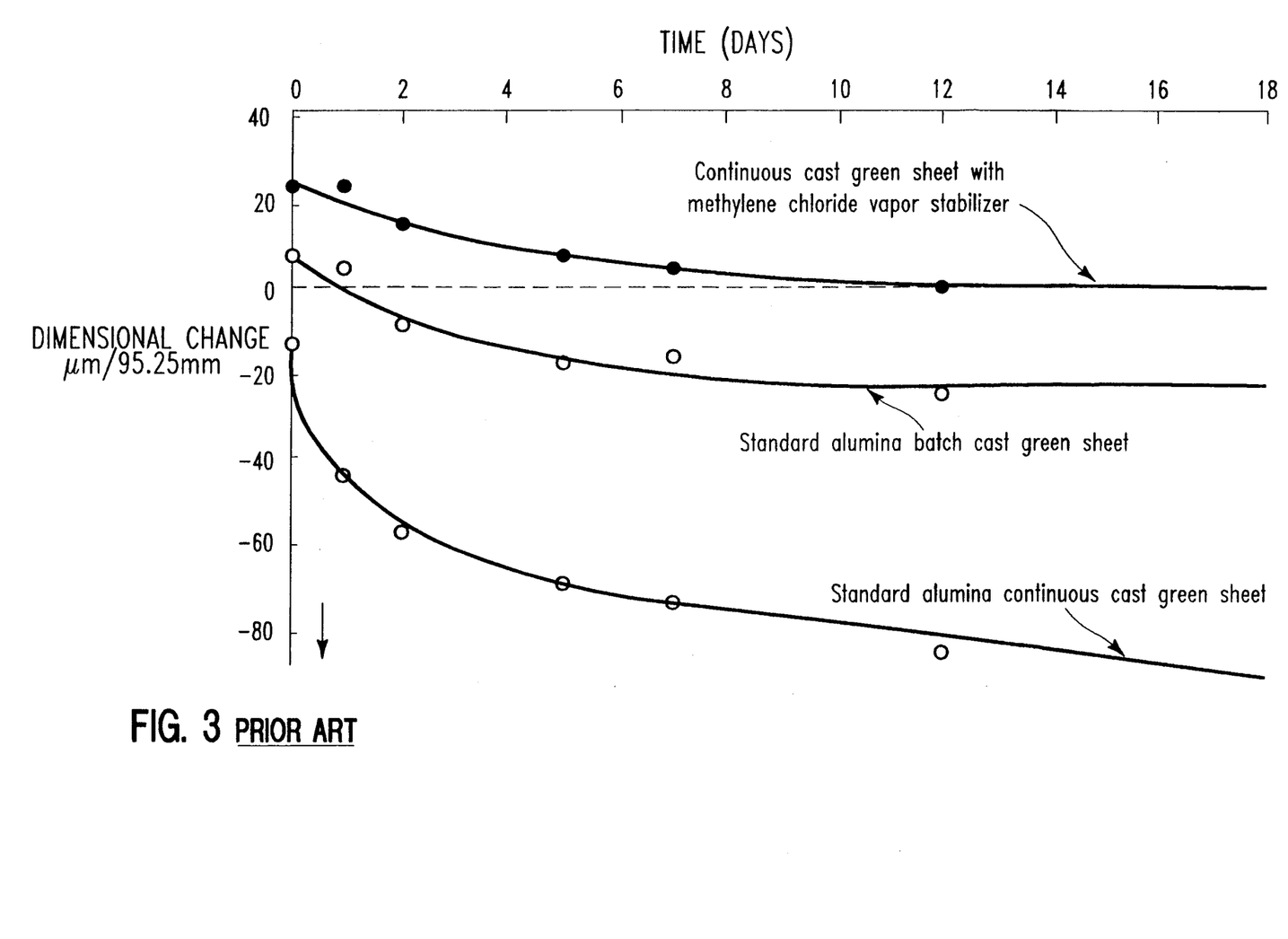
FIG. 3 shows shrinkage as a function of time after screening metallurgical paste.

Referring to FIG. 2A, an embodiment of this invention comprises an in situ air bearing stabilization system 10 that is placed in line with a continuous caster to receive a continuous green sheet 11. The air bearing stabilization system 10 produces at its output a completely stress stabilized green sheet 12 that can meet stability requirement of future products where higher density metallurgical patterns will be employed. The air bearing system consists of several integral parts that facilitate green sheet stress relaxation.

The first section of the system 10 comprises a vapor stabilization zone or section 14 with plenum chambers 38 into which treatment gases are admitted by the combined air bearing and gas treatment section 14 connected with solvent lines 36 from a manifold 26, which lines connect the solvent saturated gases to the plenum chambers 38 after passing through valves 37 which control the specific composition of the saturated gas and standard gas individually adjusted. The section 14 includes an air bearing 8 for the green sheet tape 11 generally indicated as air bearing surface and air bearing gap 8. The gases from the plenum chambers 38 pass through a porous wall 39 (ceramic or metallic) to the green sheet 11. The surface of chambers 38 and 47 confronting the air bearing 8 is composed of a material selected from porous ceramic, metals, plastics, etc. which is insoluble in the solvents used. The holes in the surfaces are on the order of dimensions of a #60 standard drill.

The last section of the system 10 comprises a drying zone or section 16 with plenum chambers 47 into which dry, solvent free gases are admitted by a manifold 45 of air lines which connect the dry gases to the plenum chambers 47 through valves 46 which are individually adjusted by composition. The dry games from the plenum chambers 47 pass through a porous wall 48 (ceramic or metallic) to dry the green sheet 11.

A loop sensor 18' is placed at the outlet along the path taken by the stabilized green sheet 12 on its way to the take up spool 40 which functions to control the loop which is being created as the green sheet 12 leaves the system 10.

In FIG. 2A the angle of the air bearings relative to the horizontal can be adjusted so that the weight of said ceramic green sheet moves the green sheet tape forward. The slope of the air bearing table is adjusted to provide a precise tension force on the green sheet tape 11, as a function of the green density of the green sheet and as a function of the configurational weight of the portion of the tape to provide loop control. The tension force is controlled below the yield point of the solvent plasticized sheet, thus not imparting any longitudinal forces that would remain as inherent stresses in the dried sheet. The rate of stress relaxation is controlled by the degree of greensheet plasticization and reduction in sheet glass transition temperature and/or increasing the ambient temperature of the air bearing medium above the polymer glass transition providing a dual method to facilitate stress relaxation. The temperature of the solvent bubbler in FIG. 2B controls the vapor pressure of the solvent and its composition in the saturated state, thus adjusting the concentration of solvent in the gas. The solvent is selected from the group consisting of water and an organic solvent that will plasticize the binder used for green sheet formation. Preferably the solvent comprises methylene chloride.

The valves 37 connect gas from manifold 36 which carries solvent and gas and manifold 36' which carries gas with a modest amount of solvent gas. Valves 46 can be adjusted to various angles to permit any combination desired.

The valves 46 connect gas from manifold 45 which carries dry gas and manifold 45' which carries gas with a modest amount of solvent gas. Valves 46 can be adjusted to various angles to permit any combination desired.

In summary, FIG. 2A illustrates an air bearing vapor stabilization tool that stabilizes a continuous green sheet 12 as it exits the continuous casters.

The system 10 consists of several air bearing segments that provide a dual sided air bearing system to convey the green sheet 11 in a completely relaxed state. The various sections float the green sheet 11 on a cushion of air whose solvent vapor concentration is precisely controlled, but can be varied along the length thereof with respect to specific solvent concentration.

The concentration of solvent vapor is maintained by passing the air through a bubbler 20 shown in FIG. 2B which adjusts the specific solvent concentration by the temperature of the bubbler 20 which maintains a specific vapor pressure. The maximum vapor pressure is that of a saturated gas. This in turn can be diluted by mixing with air. In detail, the bubbler includes a housing 19 with a porous bubbler plate 22 forming the top of an air chamber 25 in the bottom of the housing 19. Air is admitted to the air chamber 27 through inlet 21. Above the bubbler plate 22 is a chamber 24 containing stabilizing fluid 23 and saturated vapor 25 above fluid 23. The stabilizing fluid 23 is composed of a solvent such as $H_2O$ or the like. An outlet line 26 is connected to the upper portion of the chamber 24 at the top of housing 19 for exhausting the saturated vapor into line 26. The line 26 is connected to air inlet manifold 36 in FIG. 2A. A heat exchange coil 28 controls the solvent temperature and bubbler temperature to compensate for the evaporative cooling effects and the vaporizing solvents.

Figure 5:
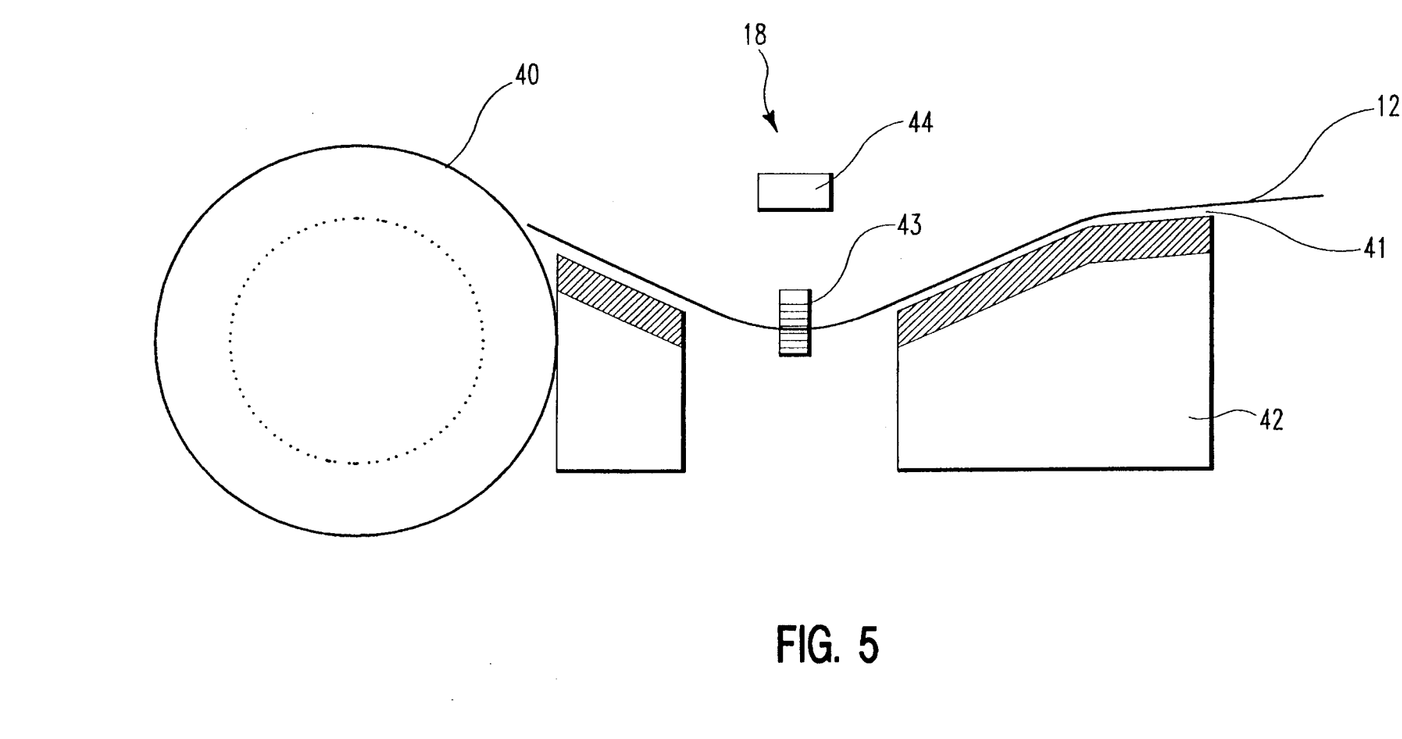
FIG. 5 shows a proportional sensor for maintaining uniform sheet spooling.

The apparatus has a number of air bearings having a solvent vapor capability and standard air bearings that dry the sheet following relaxation. On the entry and exit points loop sensor 18 provides for differential feed and take up to adjust for the slight contraction of the green sheets during this relaxation process. During the solvent stabilization process while the sheet is undergoing relaxation, the sheet contracts. The small amounts of shrinkage is compensated for using a take-up spool sensor that provides for a loop at the end of the vapor stabilization apparatus (see FIG. 5) that is activated by sensors that will control the speed of the take-up and maintain a specific loop size. Angular air bearing jets are utilized to convey the green sheet while in a super plasticized state without stressing the green sheet. The slope of the air bearing apparatus is adjustable as illustrated in FIG. 5 so that forward tape movement can be achieved using the weight of the ceramic green sheet to move the sheet forward on the frictional air bearing surface. It can be moved from a positive slope to a negative slope away from the casting apparatus, providing a zero to very minimal force to transport the tape forward.

Figure 4A:
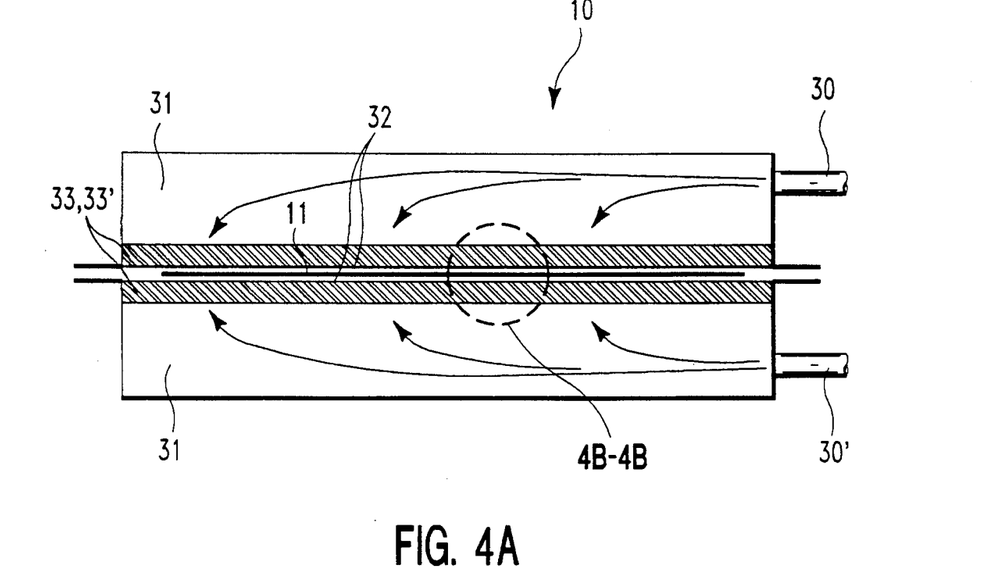
FIG. 4A shows an air bearing vapor stabilizer in accordance with this invention.

FIG. 4A shows an air bearing vapor stabilizer in accordance with this invention, air inlet pipes 30, 30', plenum chamber 31, air bearing surfaces 32, porous ceramic, metal, etc., and plates 33, 33'.

Figure 4B:
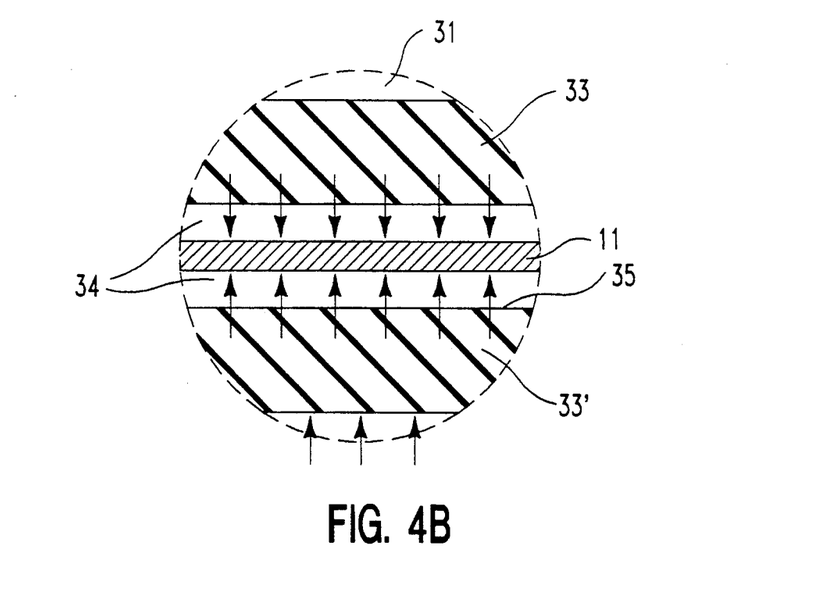
FIG. 4B shows a section of FIG. 4A illustrating an air bearing arrangement in accordance with this invention.

FIG. 4B shows a section of FIG. 4A illustrating an air bearing arrangement in accordance with this invention, as well as solvent vapor treatment spaces 34 above and below sheet 11, and air bearing surface 35 on the top of lower plate 33'.

FIG. 5 shows a proportional sensor for maintaining uniform sheet spooling onto take-up spool 40. The sheet 12 passes over air-bearing gap 41 across the top of plenum chamber 42 to the area of sensor 18 which can be a lateral optical diode tape position sensor using optical diodes or the like well known to those skilled in the art. Alternatively, the sensor 18 can comprise the vertical distance sensor comprising sonic, electrical or optical distance sensing means for detecting the vertical elevation of the base of the loop of sheet 12.

Solvents suitable for inclusion in the gas for stabilization.

The solvent used for solvent stabilization in the present invention can be organic or inorganic; if organic, it can be aromatic or non-aromatic; if aromatic, it can be monaryl or polyaryl; if non-aromatic it can be saturated, unsaturated or substituted with various substituents, so long as they do not adversely react with the components of the green ceramic sheet, e.g., degrade the same.

Of the inorganic solvents used to conduct solvent stabilization in accordance with the present invention, the one most commonly used considering cost is, of course, water.

For example, water could be utilized to solvent stabilize a green sheet containing a water soluble polymer, for example, polyvinyl alcohol, methyl cellulose, ethyl cellulose and like materials. It is obviously impossible to list all useful organic solvents. They are generally selected applying the heretofore discussed guidelines. However, certain binders are more commonly used in the ceramic sheet casting art and the following listing provides a representative correlation of some of these binder-solvent systems:

I. Polyvinyl butyrals:
  i. ethers, such as ethyl ether, dioxane and the like;
  ii. ketones, such as acetone and the like;
  iii. aromatics, such as benzene, toluene, and mixtures thereof with alcohols such as ethanol and the like;
  iv. alcohols, such as methanol, ethanol, etc.
  v. halogenated hydrocarbons, such as carbon tetrachloride, dichloroethylene, 2-chloroethanol or 2-chlorobutanol and the like;
  vi. esters, such as ethyl acetate, ethyl lactate, benzyl acetate, and the like;
  vii. cyclic materials, such as cyclohexanone, and the like;
II. Polyvinyl acetates:
  i. halogenated hydrocarbons, such as chloroform, carbon tetrachloride, dichloroethylene, and the like;

ii. alcohols such as the C,-CX lower alcohols, benzyl alcohol, tetrahydrofurfuryl alcohol (non-preferred due to its high boiling point), and the like;
iii. aromatic hydrocarbons such as benzene, toluene, and the like;
iv. ketones such as acetone, methylethylketone, methylisopropylketone and the like;
v. ethers as in (I)(i) above;

III. Acrylates and methacrylates, e.g., the C,-C,, alkyl acrylates and methacrylates, especially the CX-C3 alkyl acrylates and methacrylates:
  i. halogenated hydrocarbons, especially as in (I)Xv) and (1I) (i) above;
  ii. aromatics, as in (I)(iii) above;
  iii. halogenated hydrocarbons such as chloroform, carbon tetrachloride, dichloroethylene, chlorobenzene, tetrachloroethylene, trichloroethylene and the like;
  iv. ketones as in (I)(ii);
  v. esters, as in (I)(vi);

As will be clear from the heretofore offered discussion, there are not substantial limits posed upon the solvent used for the stabilization procedure of the present invention. However, certain solvents are preferred for practical reasons, viz: those which are low in cost and easily available; those which are relatively non-toxic; and those which have a high vapor pressure and can be easily volatilized from the stabilized ceramic green sheet; rapid removal at the completion of stabilization is desired.

IV. Polyvinyl ethers, especially the polyvinyl C,-C, alkyl ethers:
  i. aromatic hydrocarbons such as in (II)(iii) above;
  ii. chlorinated hydrocarbons such as methylene, dichroic, chloroform, carbon trichloride and the like;
  iii. ketones such as acetone, methylethylketone and the like;
  iv. esters, such as ethyl acetate, butyl acetate and the like.

V. Cellulose nitrates and trinitrates:
  i. alcohols such as the C,-C, lower alcohols
  ii. ethers, as in (I)(i) above;
  iii. ketones in (IV)(iii) above;
  iv. halogenated hydrocarbons as above recited.

VI. Cellulose materials, such as methyl ethyl and butyl cellulose:
  i. inorganic solvents such as water are preferred.

VII. Polystyrenes:
  i. halogenated hydrocarbons such as methylene chloride and the like;
  ii. ketones such as in (I)(ii) above;
  iii. aromatic hydrocarbons such as in (1I)(iii) above.

Other resin binders occasionally encountered in the ceramic sheet casting art include the cellulose Acetates the coumarone-indenes, the polycoumarones, polyvinyl ethers of maleic anhydride, polyvinyl chloride (non-preferred due to chlorine evolution during firing) aliphatic hydrocarbon resins which are petroleum products based on long chain paraffins, terpene resin and the like.

Such materials and other resin binders which can be used for ceramic sheet casting are recited in "Polymer Handbook", J. Brandrup and E. H. Immergut, Interscience Division of John Wiley and Sons New York, N.Y. 1966, hereby incorporated by reference. Specific attention is directed to pages 185-23X. Although such will be apparent to one skilled in the art in view of earlier discussion, the present invention does not apply, as a practical matter, to resins which cannot be slip cast in solvated form, e.g., polytetrafluoroethylene, which is insoluble in commonly used solvents, and in general is limited to the thermoplastic materials, be they natural or synthetic.

While this invention has been described in terms of the above embodiment(s), those skilled in the art will recognize that the invention can be practiced with modifications within the spirit and scope of the appended claims.

What is claimed is:

1. A process for solvent vapor stabilizing to achieve stress relaxation, a cast, substantially completely dried ceramic green sheet tape comprising remaining casting solvent, a particulate ceramic and a thermoplastic polymeric binder, said process comprising
passing said green sheet tape through an air bearing stablilization system provided with dual sided air bearings which float said green sheet tape upon a cushion of air containing solvent vapor whose solvent vapor is maintained by passing air for said air bearing through a bubbler, said solvent vapor being adapted for solvent plasticizing said polymer binder.

2. A process in accordance with claim 1 wherein angular air bearing jets are used to convey the green sheet tape during the process of relaxation.

3. A process of claim 1 including controlling the temperature of said air bearings to a temperature above the glass transition temperature of said ceramic green sheet tape.

4. A process of claim 1 wherein the air bearing system is adjusted to have a slope angle so that the weight of said ceramic green sheet tape moves said green sheet tape forward.

5. A process of claim 4 wherein said slope of said air bearing system is adjusted to provide a precise tension force on said green sheet tape, as a function of the green density of said green sheet and as a function of the weight of a portion of said tape to provide loop control.

6. A process of claim 5 with said tension force is controlled to be below the yield point of said solvent plasticized sheet, thus not imparting any longitudinal forces that would remain as inherent stresses in said dried sheet.

7. A process of claim 1 whereby stress relaxation is controlled to have a rate dependent on the degree of greensheet plasticization, reduction in sheet glass transition temperature and/or an increase in the temperature of air in the stabilization system.

8. A process of claim 1 wherein the temperature of said solvent bubbler controls the vapor pressure of said solvent and its composition.

9. A process of claim 1 wherein said solvent is selected from the group consisting of water and an organic solvent.

10. A process of claim 8 wherein said solvent comprises a solvent for binders selected from the group consisting of polyvinyl butyrals, polyvinyl acetates, polyacrylates and methacrylates, polyvinyl ethers, cellulose materials and polystyrenes.

11. A process of claim 1 where a tape up loop sensor controls the speed of a take up apparatus.

12. A method in accordance with claim 1 wherein the glass transition temperature of the polymer binder is temporarily reduced.

* * * * *